US012561604B2

(12) United States Patent
Kashif et al.

(10) Patent No.: US 12,561,604 B2
(45) Date of Patent: Feb. 24, 2026

(54) SYSTEM AND METHOD FOR ITERATIVE DATA CLUSTERING USING MACHINE LEARNING

(71) Applicant: Cvent, Inc., Tysons Corner, VA (US)

(72) Inventors: Lashkar Kashif, Tysons Corner, VA (US); Casey Hartnett, Tysons Corner, VA (US)

(73) Assignee: CVENT, INC., Tysons Corner, VA (US)

( * ) Notice: Subject to any disclaimer, the term of this patent is extended or adjusted under 35 U.S.C. 154(b) by 934 days.

(21) Appl. No.: 17/373,021

(22) Filed: Jul. 12, 2021

(65) Prior Publication Data

US 2022/0188702 A1     Jun. 16, 2022

Related U.S. Application Data

(60) Provisional application No. 63/126,239, filed on Dec. 16, 2020.

(51) Int. Cl.
G06N 20/00 (2019.01)
(52) U.S. Cl.
CPC .................................... G06N 20/00 (2019.01)
(58) Field of Classification Search
CPC ........... G06N 20/00; G06N 20/10; G06N 3/08
See application file for complete search history.

(56) References Cited

U.S. PATENT DOCUMENTS 11,444,847 B1 *  9/2022  Wernick .............. G06F 3/04847
2016/0004985 A1 *  1/2016  Blomberg ........ G06Q 10/06313
705/342

2016/0275458 A1 *  9/2016  Meushar .............. G06Q 10/109
2020/0364245 A1 *  11/2020  Sinha .................... G06F 3/0482
2022/0101069 A1 *  3/2022  Jia ........................... G06F 17/18

OTHER PUBLICATIONS

Adhikari, Sam. "Learning Systems Based Automated Proposal Evaluation." (Year: 2013).*
Fujita, André, Daniel Y. Takahashi, and Alexandre G. Patriota. "A non-parametric method to estimate the number of clusters." Computational Statistics & Data Analysis 73 (2014): 27-39. (Year: 2014).*
Covoes, Thiago F., Eduardo R. Hruschka, and Joydeep Ghosh. "A study of k-means-based algorithms for constrained clustering." Intelligent Data Analysis 17.3 (2013): 485-505. (Year: 2013).*
Jannach, Dietmar, Markus Zanker, and Matthias Fuchs. "Constraint-based recommendation in tourism: A multiperspective case study." Information Technology & Tourism 11.2 (2009): 139-155. (Year: 2009).*

(Continued)

*Primary Examiner* — Miranda M Huang
*Assistant Examiner* — Sidney Vincent Bostwick
(74) *Attorney, Agent, or Firm* — Jeffri A. Kaminski; Venable LLP

(57) ABSTRACT

Systems, methods, and non-transitory computer-readable storage media which train a machine learning algorithm using a training set of Requests for Proposals (RFPs), then cluster a second set of RFPs using the trained machine learning algorithm. Distinct clusters are then compared to historical data, and an outlier is identified. An alert regarding that outlier is then transmitted across a network to an entity associated with the outlier.

18 Claims, 9 Drawing Sheets

(56) References Cited

OTHER PUBLICATIONS

Sharma, Richa, Jaspreet Bhatia, and K. K. Biswas. "Automated identification of business rules in requirements documents." 2014 IEEE International Advance Computing Conference (IACC). IEEE, 2014. (Year: 2014).*

Rahman, Muhammad Mahbubur, and Tim Finin. "Unfolding the structure of a document using deep learning." arXiv preprint arXiv:1910.03678 (2019). (Year: 2019).*

Vacca, John R. "A step-by-step guide to writing a successful RFP." Winning the Outsourcing Game. Auerbach Publications, 2000. 105-122. (Year: 2000).*

Soylu, Ahmet, et al. "Enhancing public procurement in the European Union through constructing and exploiting an integrated knowledge graph." International Semantic Web Conference. Cham: Springer International Publishing, 2020. (Year: 2020).*

Fazekas, Mihály, István János Tóth, and Lawrence Peter King. "An objective corruption risk index using public procurement data." European Journal on Criminal Policy and Research 22.3 (2016): 369-397. (Year: 2016).*

* cited by examiner

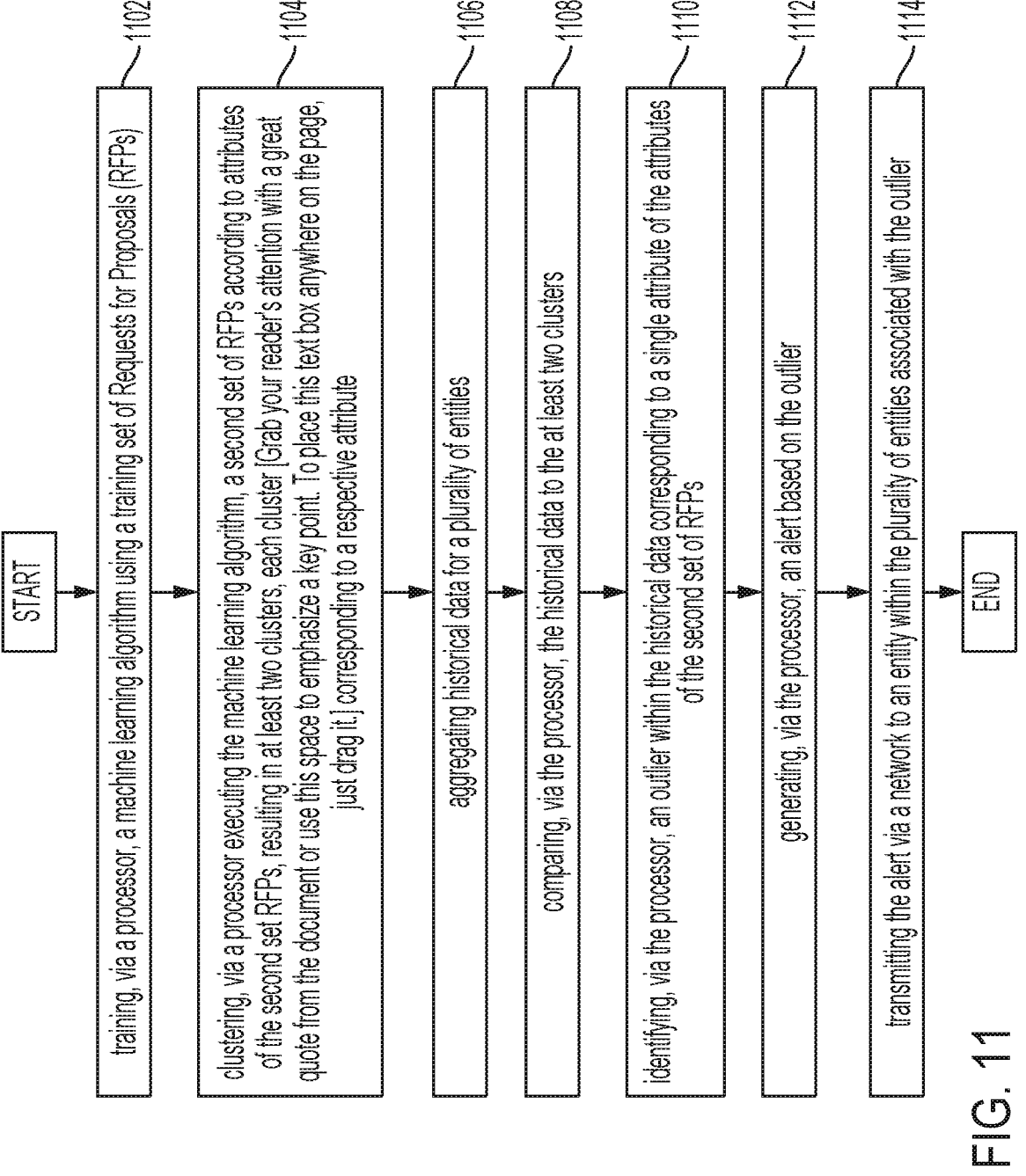

START training, via a processor, a machine learning algorithm using a training set of Requests for Proposals (RFPs) — 1102 clustering, via a processor executing the machine learning algorithm, a second set of RFPs according to attributes of the second set RFPs, resulting in at least two clusters, each cluster [Grab your reader's attention with a great quote from the document or use this space to emphasize a key point. To place this text box anywhere on the page, just drag it.] corresponding to a respective attribute — 1104 aggregating historical data for a plurality of entities — 1106 comparing, via the processor, the historical data to the at least two clusters — 1108 identifying, via the processor, an outlier within the historical data corresponding to a single attribute of the attributes of the second set of RFPs — 1110 generating, via the processor, an alert based on the outlier — 1112 transmitting the alert via a network to an entity within the plurality of entities associated with the outlier — 1114

END

FIG. 11

SYSTEM AND METHOD FOR ITERATIVE DATA CLUSTERING USING MACHINE LEARNING

CROSS REFERENCE TO RELATED APPLICATIONS

This application claims priority to U.S. Provisional Patent Application No. 63/126,239, filed Dec. 16, 2020, which is hereby incorporated herein by reference in its entirety.

BACKGROUND

1. Technical Field

The present disclosure relates to data clustering, and more specifically to using machine learning to iteratively improve data clustering.

2. Introduction

In the US, about a third of a hotel's revenue derives from meetings and events, also known as group business. Hotels gain group business revenue from sleeping rooms, meeting space, food & beverage, audiovisual and other sources. This being such a significant revenue generator, it is crucial for hoteliers to be able to target and win group business.

Hoteliers receive group business in the form of Requests For Proposal (RFPs), on which they send out proposals, and may subsequently be awarded ('win') the business. A hotelier typically receives a large volume of RFPs, and must prioritize the best ones to propose on based on award likelihood. This takes time and effort on the hotelier's part and often does not correspond to RFPs that they have a high likelihood of being awarded. Thus, the hoteliers' time and effort are not being used effectively.

SUMMARY

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media which provide a technical solution to the technical problem described. A method for performing the concepts disclosed herein can include: training, via a processor, a machine learning algorithm using a training set of Requests for Proposals (RFPs); clustering, via a processor executing the machine learning algorithm, a second set of RFPs according to attributes of the second set of RFPs, resulting in at least two clusters, each cluster corresponding to a respective attribute; aggregating historical data for a plurality of entities; comparing, via the processor, the historical data to the at least two clusters; identifying, via the processor, an outlier within the historical data corresponding to a single attribute of the attributes of the second set of RFPs; generating, via the processor, an alert based on the outlier; and transmitting the alert via a network to an entity within the plurality of entities associated with the outlier.

A system configured to perform the concepts disclosed herein can include: a processor; and a non-transitory computer-readable storage medium having instructions stored which, when executed by the processor, cause the processor to perform operations comprising: training a machine learning algorithm using a training set of Requests for Proposals (RFPs); clustering, by executing the machine learning algorithm, a second set of RFPs according to attributes of the second set of RFPs, resulting in at least two clusters, each cluster corresponding to a respective attribute; aggregating historical data for a plurality of entities; comparing the historical data to the at least two clusters; identifying an outlier within the historical data corresponding to a single attribute of the attributes of the second set of RFPs; generating an alert based on the outlier; and transmitting the alert via a network to an entity within the plurality of entities associated with the outlier.

A non-transitory computer-readable storage medium configured as disclosed herein can have instructions stored which, when executed by a computing device, cause the computing device to perform operations which include: training a machine learning algorithm using a training set of Requests for Proposals (RFPs); clustering, by executing the machine learning algorithm, a second set of RFPs according to attributes of the second set of RFPs, resulting in at least two clusters, each cluster corresponding to a respective attribute; aggregating historical data for a plurality of entities; comparing the historical data to the at least two clusters; identifying an outlier within the historical data corresponding to a single attribute of the attributes of the second set of RFPs; generating an alert based on the outlier; and transmitting the alert via a network to an entity within the plurality of entities associated with the outlier.

BRIEF DESCRIPTION OF THE DRAWINGS

FIG. 11 illustrates an example method as described herein; and

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

An event planner, either from an organization hosting an event or from a 3rd party company that the hosting organization has retained, submits a Request For Proposal (RFP) to a number of hotels. The RFP specifies the dates of the event, the number of sleeping room nights and meeting rooms needed, the number of event attendees per day and other necessary parameters.

Some of the receiving hotels will turn the RFP down, or choose not to respond to it. Some receiving hotels will respond to the RFP by submitting proposals to the planner. There may be one or more rounds of negotiation between the planner and the proposing hotel/s on pricing and other aspects, upon which the planner awards the business to a hotel and declines the business to the remaining hotels that proposed on the RFP. The planner may cancel a submitted RFP before a proposal has been received, while a hotel may withdraw a proposal after sending it.

Figure 1:
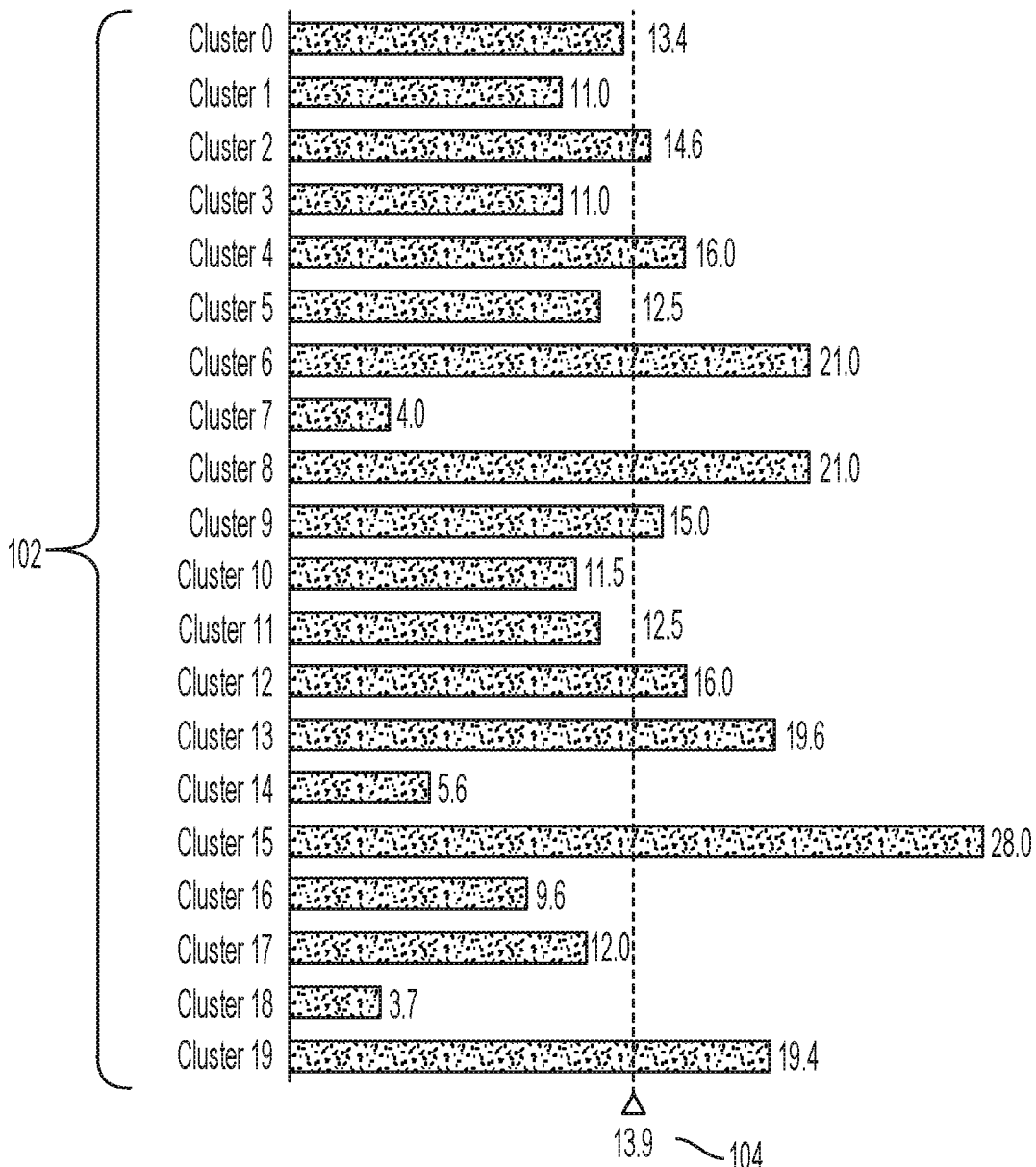
FIG. 1 illustrates an example of RFP reward rates for hotels.

A hotelier's time is used more efficiently when they respond to an RFP with a high likelihood of being awarded. Using RFP clusters, users of the disclosed concepts able to identify RFP submissions that have high award likelihood, at either a hotel chain level or a more granular brand level. FIG. 1 shows the RFP award rate in each of the 20 clusters—together with the average award rate—for a hotel brand operating in the US. The dashed vertical line indicates the average RFP award rate for the brand.

If a hotel receives an RFP in a high award rate (HAR) cluster, users of the disclosed concepts can generate an alert to that hotel to notify them immediately. Similarly, if an RFP in a HAR cluster remains un-responded to for a specific duration, e.g., a week, users of the disclosed concepts can create an alert for the hotel to take action. Resultant changes in RFP response behavior can lead to greater revenue for the hotel, while saving time and effort.

The innovations disclosed herein can, to a degree, be separated into (1) data clustering using machine learning/k-means clustering algorithms, and (2) providing meaningful use cases for that clustered data. However, in practice the respective parts are combined into a single system, providing users the ability to use machine learning to cluster RFP data and receive recommendations regarding how to utilize advantages derived from the data clusters.

Targeted Advertisements on a Supplier Network (SN)

While existing advertisements available on a SN are effective for hotels receiving a larger market share of RFP demand, there is value in using RFP clusters for targeted ads. The goal would be to increase hotel visibility for specific RFPs or RFPs in high award rate clusters specific to the hotel's brand. This creates more visibility to meeting planners sourcing RFPs that best suit the hotel, and ultimately will have a higher likelihood of choosing the targeted hotel as the ultimate destination for their meeting.

For example, if a hotel prefers to receive RFPs for long-duration events requiring meeting space from the pharmaceutical sector, the hotel's ads can be boosted in SN search results for events with parameters that would place the RFP in a matching cluster. The hotel then receives more RFPs matching its preferences, while the venue selection and award process becomes simpler for the event planner.

RFP clusters can easily be extended to include other RFP and hosting organization attributes, such as the industry sector of the hosting organization. That is, the disclosed system can use any number of attributes to create clusters. Likewise, the disclosed system can create any number of clusters, depending on specific configurations and circumstances. For example, the system can also create a larger number of clusters: in general, the more granular the clusters, the more precise targeting is possible.

Competitor Insights

For a given hotel brand or chain, insights on its top competitors can be extracted for each RFP cluster. Since the RFPs within a cluster are similar, this means that a hotel can keep informed on the behaviors of its top competitors on similar sets of events. Users of the disclosed concepts can provide these insights for all RFP clusters, for clusters containing the largest fraction of RFPs for a given brand/chain alone, or for clusters with the highest award rates for the brand/chain alone.

Table 1 shows an example of competitor insights using RFP clusters for 'hotel chain E'. In this case, the insights are provided in the four clusters containing the largest fraction of RFPs for the chain.

TABLE 1

Competitor insights table for hotel Chain E. The clusters shown
are the top 4 clusters for Chain E ranked by the percentage of
RFPs received by this chain. The cluster IDs are arbitrary.

| Cluster no. | % of RFPs of Chain E | AR for Chain E (%) | High Award Rate cluster for Chain E? | Top competitor chains by no. of RFPs received | Combined AR for top competitors (%) | Total % of RFPs not awarded to Chain E that were awarded to top competitors |
|---|---|---|---|---|---|---|
| 1 | 16 | 16 | No | Chain A Chain B Chain C | 17 | 14.1 |
| 2 | 13 | 13 | No | Chain A Chain B Chain D | 13 | 12 |
| 3 | 12 | 20 | Yes | Chain A Chain B Chain D | 15 | 17.6 |
| 4 | 9 | 20 | Yes | Chain F Chain G Chain H | 12 | 0.8 |

Figure 2A:
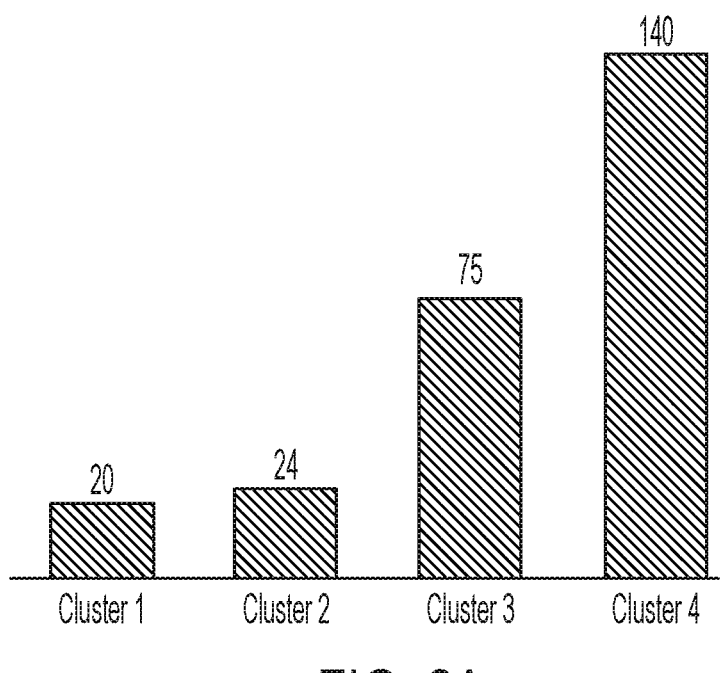
FIG. 2a illustrates an example of average attendee numbers for clustered RFP data.
Figure 2B:
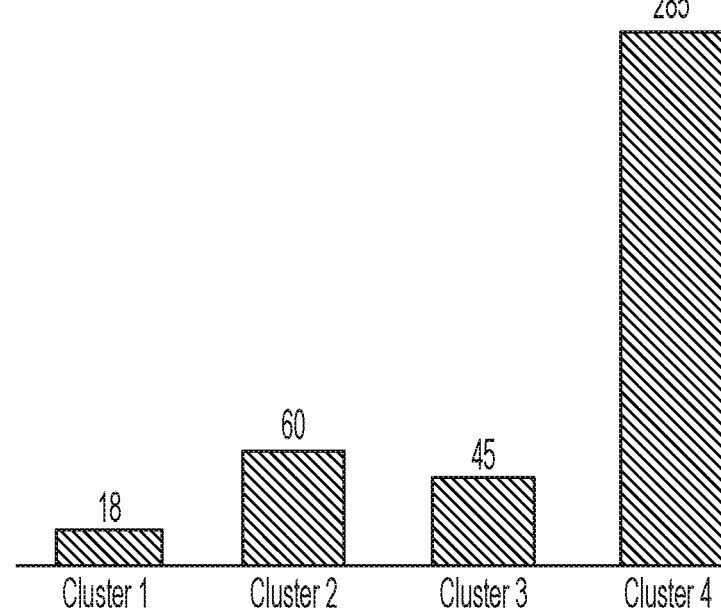
FIG. 2b illustrates an example of average room night count for clustered RFP data.

Collectively, these four clusters contain 50% of the total number of RFPs received by Chain E in 2019. In clusters 1, 2 and 3, the top competitors are roughly the same set: chains A, B, C and D. In cluster 4, however, the top competitors are a different set of chains. Cluster 4 has a very different composition from the others—predominantly containing RFPs with high attendee numbers (>100) and high room night counts (>100), while the other clusters contain smaller RFPs. These differences are highlighted in FIGS. 2a and 2b. In FIG. 2a, the average values of attendee numbers for the four clusters shown in Table 1 is illustrated. In FIG. 2b, the average values of room nights for the four clusters shown in Table 1 is illustrated.

In clusters 1 and 2, combined RFP award rates for the top competitors are of the same order as for Chain E, while in clusters 3 and 4, Chain E has larger award rates than its competitors. This is especially true for cluster 4. The right-most column in Table 1 shows the percentage of RFPs not awarded to Chain E that were awarded to the top competitor chains in aggregate. These numbers provide insight into how much group business that Chain E did not get was awarded to its top competitors in each cluster.

Event and RFP Attributes

Figure 3:
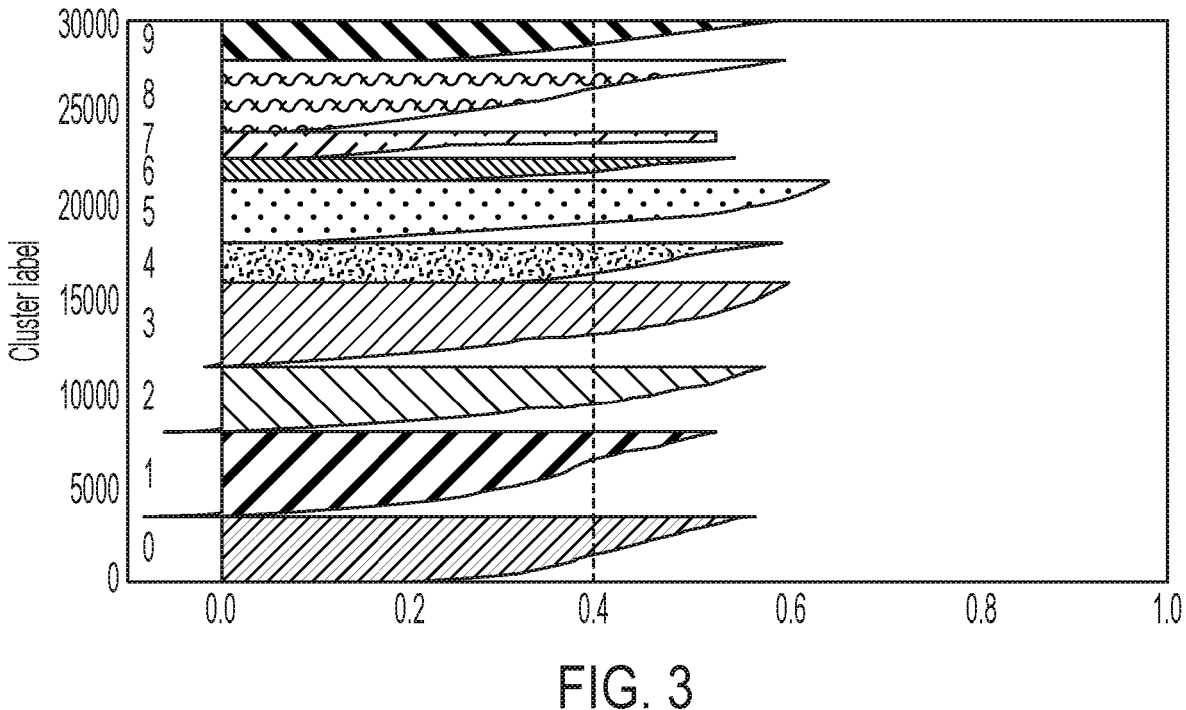
FIG. 3 illustrates an example of silhouette clustering.

FIG. 3 shows the percentage of RFPs submitted through Supplier Network (SN) to hotels in various chain scales. A chain scale is assigned to an individual hotel brand, and consists of the categories: Economy, Midscale, Upper Mid-scale, Upscale, Upper Upscale, Luxury and Independent. The dataset consists of 1 million RFPs sent using SN during 2019. Hotels under Upper Upscale brands received almost half (45%) of all RFP submissions, while Economy (1%) and Midscale (2%) brands received the fewest submissions.

Event duration, number of attendees, number of room nights (the total number of rooms a planner commits to occupy at a hotel for an event, summed over all nights that each room will be occupied for) and the need for meeting space are some defining attributes of events. Others can include the RFP length, if a third party planner is being used, if the requesting entity is a corporate entity, and the number of meeting rooms needed. Additionally, the market segment of the hosting organization, its industry sector (such as pharmaceutical, travel, or other industries), and whether the RFP is created by a $3^{rd}$ party event planner are important characteristics to understand as well.

Figure 4:
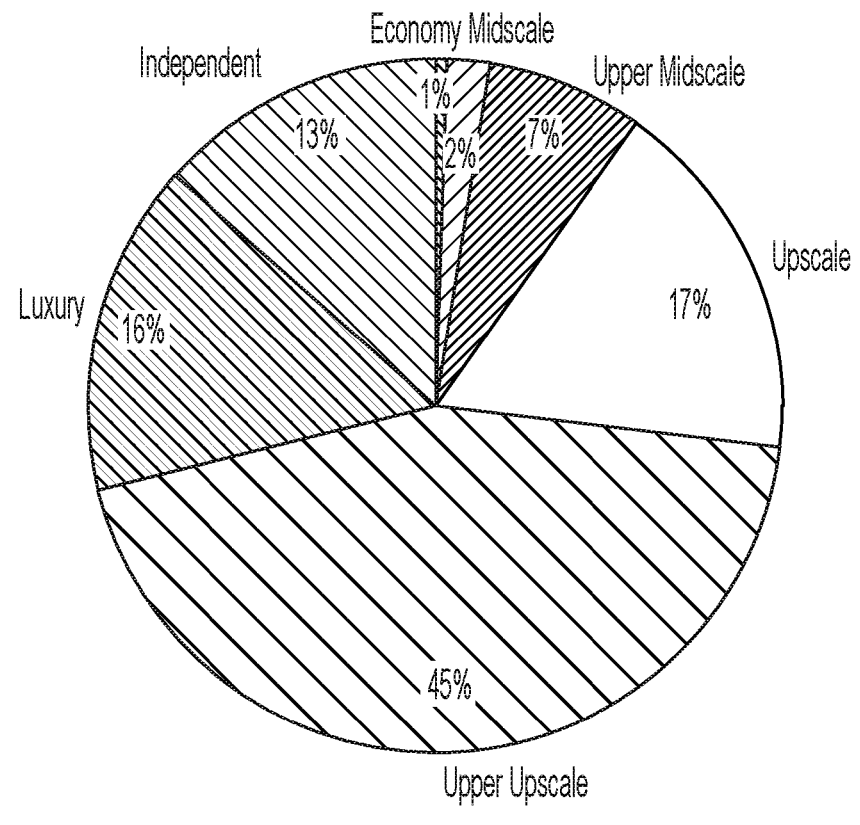
FIG. 4 illustrates a pie chart regarding originations of RFP submissions.
Figure 5:
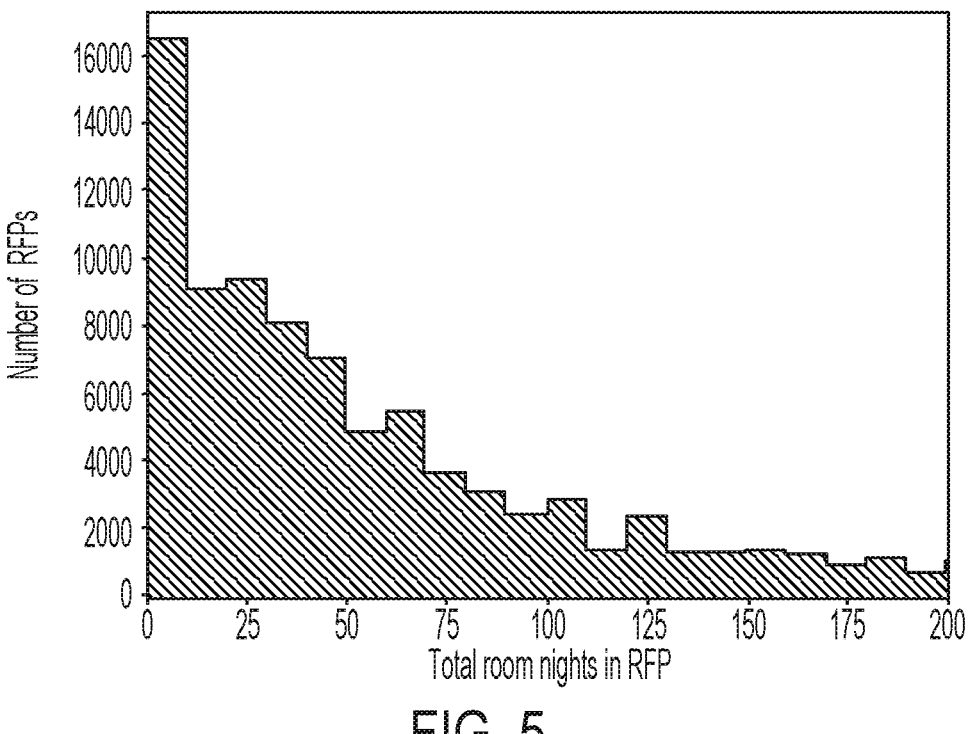
FIG. 5 illustrates a chart comparing total RFPs to room nights required.
Figure 6:
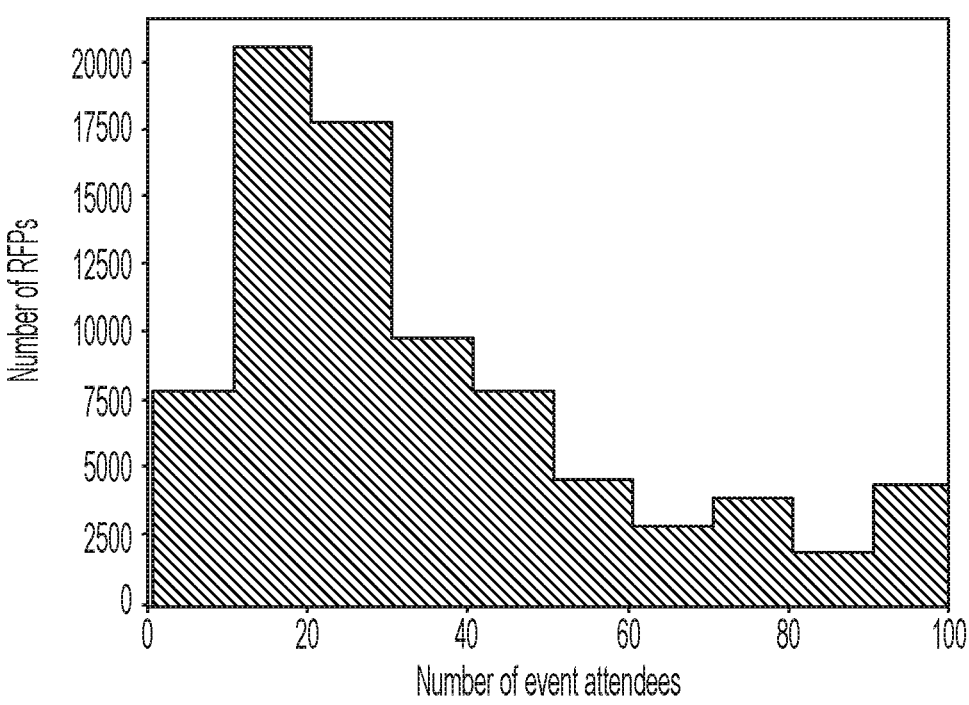
FIG. 6 illustrates a chart comparing total RFPs to number of event attendees.

The number of event attendees can range from less than 10 to tens of thousands. Half of RFPs created in SN require less than 50 room nights (FIG. 4), while 80% of RFPs are for events with less than 100 attendees (FIG. 5). 61% of events require both sleeping rooms and meeting space, 34% of events require sleeping rooms but not meeting space, while 4% of events need meeting space only (FIG. 6).

Figure 7:
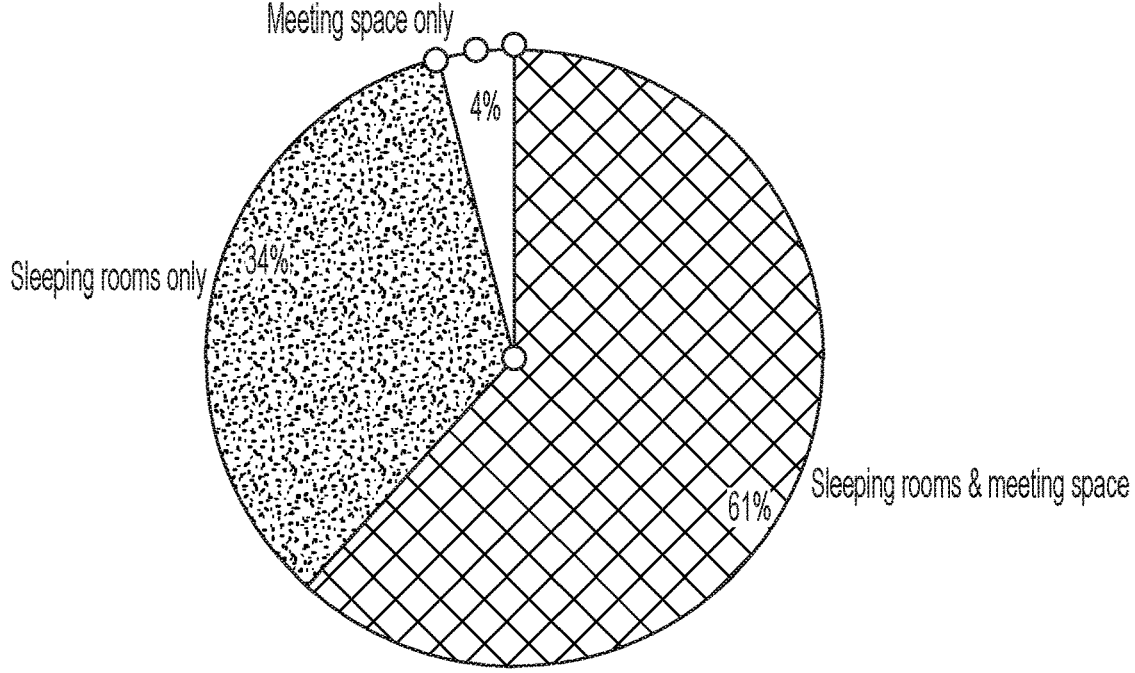
FIG. 7 illustrates a pie chart regarding rooms and meeting spaces.

About two-thirds of events are hosted by corporations, that is, for-profit businesses (FIG. 7). Associations, SMERFs ('Social, Military, Education, Religious, Fraternal') and other organizations comprise a third of RFPs created via SN.

For a specific hotel, the proposal rate PR over a given time period is defined as:

$$PR = \frac{\text{Number of proposals on } RFPs \text{ sent by the hotel}}{\text{Number of } RFPs \text{ submitted to the hotel}}$$

The RFP award rate AR is defined as:

$$AR = \frac{\text{Number of } RFPs \text{ awarded to the hotel}}{\text{Number of proposals on } RFPs \text{ sent by the hotel}}$$

Patterns in the RFP Data

If RFPs can be grouped into categories, these categories can be used to derive actionable insights, direct a hotel's efforts to the best RFPs, and design ads for hotels to target specific types of events. With this in mind, the system identifies, for a given set of RFPs, the following questions:

Do RFPs have natural groupings? That is, can RFPs be grouped into clusters based on event and hosting organizations parameters—regardless of which hotels the RFPs are submitted to?

If RFPs do form well-defined clusters, is there significant differentiation in RFP outcomes among the clusters, in particular in the award rate?

Are there significant differentiations in RFP outcomes among the clusters for different hotel brands and chains?

Machine Learning Driven Clustering of RFPs

Figure 8:
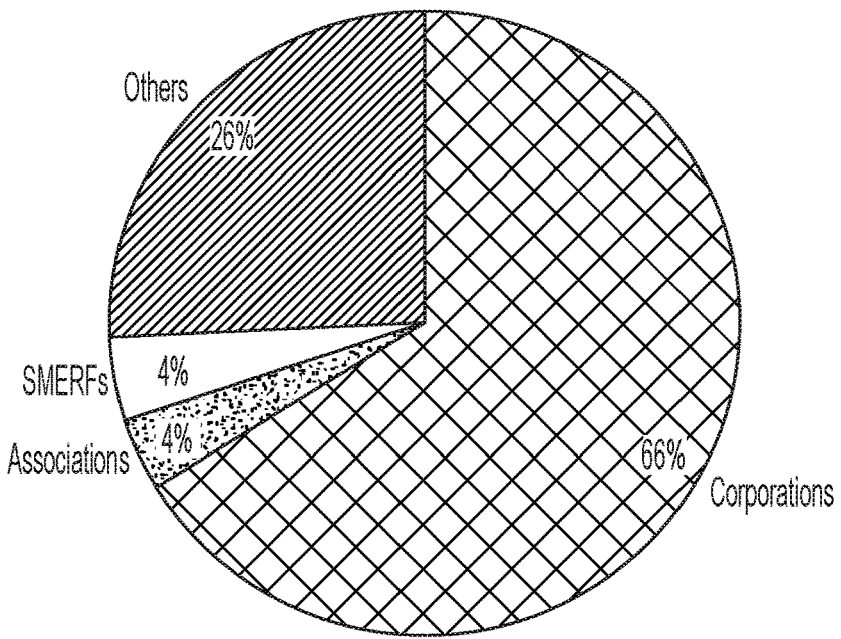
FIG. 8 illustrates a pie chart regarding hosting organizations.
Figure 9:
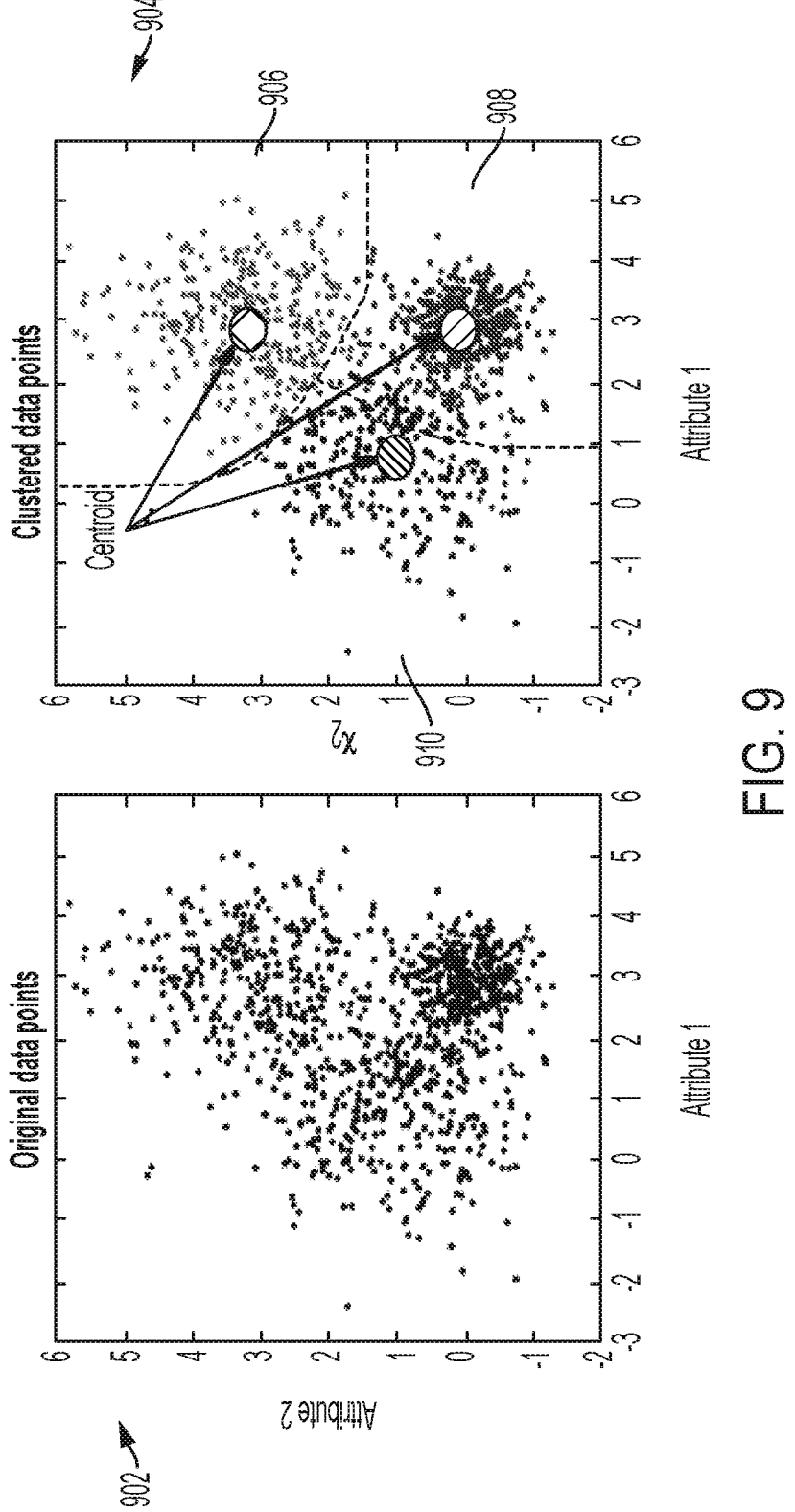
FIG. 9 illustrates an example of k-means clustering.

The system uses a machine learning (ML) approach to cluster the data; specifically, the k-means clustering method. As an example of the k-means clustering method, suppose there are n data points, each with x attributes. In our case, each data point is an RFP, and each attribute is an RFP parameter such as the number of sleeping room nights, event duration etc. The systems seeks to cluster the data points in the multivariate space of these attributes, and users can designate a specific number of clusters. The process is illustrated in FIG. 8, where the algorithm is asked to group the data into three clusters using attributes one and two. In other configurations, a user can designate a different number of clusters, or can defer the decision for the number of clusters to the system based on criteria such as the distance to each centroid, etc.

The algorithm starts by randomly selecting three data points, which are provisional cluster centroids. It calculates the distance of each data point from each of these centroids, and assigns each data point to the centroid that it is nearest to. Thus, it creates three provisional clusters of data points. Then the algorithm re-calculates the centroid of each cluster as the average of all data points assigned to it, re-calculates the distance of each data point from the new centroids, and repeats the cluster assignment. It repeats this procedure until the cluster assignment of data points do not change, at which stage there are three stable clusters. Each data point belongs to one cluster only.

In testing the clustering, a representative sample of 257,000 RFPs sent via SN during the 2017-2019 was used. For that set of data, a number of event, planner, and hosting organization attributes were used to create clusters, and found the following six to be the best defining attributes:

Attendees: the total number of attendees

Room nights: the total number of room nights needed

RFP duration: the length of the event

3rd party planner flag: whether or not the planner is from an event organization company retained by the hosting company Meeting room need: whether or not meeting rooms are needed for the event Corporate flag: whether or not the hosting organization is a business entity Other variables/attributes which can be used for the clustering can include award rate for a given hotel or brand (the percentage of total RFPs awarded), the cancel rate (percentage of total RFPs cancelled for the hotel or brand), the proposal sent rate (the average number of RFPs proposed for the hotel or brand), the average RFP's distance to an airport, and/or the average proposal low rate.

During that testing clustering schemes using 10, 20, 30 and 50 clusters were also explored. In determining the number of clusters to use, a key factor is identifying how distinguishing the respective clusters are from one another, and how they compare to the average threshold within the group. For example, as illustrated in FIG. 1, there are 20 clusters 102, and the average threshold is represented by the dotted line 104. The goal is to find enough separation of the data to identify unique clusters, while simultaneously avoiding clusters that have data points which are too similar to other clusters. The more clusters presented, the more granular insights extracted from the data, however there are statistical and qualitative limitations based on the amount of data.

The divisions between clusters can be illustrated using a silhouette plot. In a silhouette plot, the distance of a given point to the centroid of its assigned cluster can be illustrated, as well as distance to neighboring clusters. In such a plot, the division between the clusters can be qualitatively judged by a user or other individual to verify that the clusters are being correctly identified. Alternatively, the system can use the slopes generated with each cluster's silhouette to determine if the drop-off between clusters are too acute or too diffuse, at which point the system can initiate a recalculation of the clusters using distinct centroids, additional centroids (resulting in more clusters), etc.

The following results are from a 20-cluster scheme, which is a sufficient number to show significant differentiation among clusters.

Results

The algorithm finds well-differentiated clusters of RFPs based on the attributes listed above. For a representative sample of 5 of the 20 clusters, Table 2 shows the number and percentage of RFPs in the cluster, as well as the average value of each attribute for RFPs in the cluster. The clusters show significant differentiation in the event size parameters (number of attendees and room nights), event duration and other clustering attributes, as well as in the percentage of RFPs in each cluster.

TABLE 2

Cluster population and average values of clustering attributes for 5 RFP clusters. The cluster ID is arbitrary. For the Yes/No attributes, the average value is typically very close to either Yes or No.

| | | | Average values of attributes in cluster | | | | | |
|---|---|---|---|---|---|---|---|---|
| Cluster no. | RFPs in cluster | % of all RFPs in cluster | Attendees | Room nights | RFP duration (days) | 3rd party planner? | Meeting room? | Corporate? |
| 1 | 10000 | 3.9 | 70 | 40 | 1 | Yes | No | Yes |
| 2 | 8900 | 3.5 | 73 | 168 | 3 | No | No | No |
| 3 | 15700 | 6.2 | 140 | 274 | 3 | Yes | No | Yes |
| 4 | 24000 | 9.4 | 16 | 20 | 1 | Yes | No | No |
| 5 | 6700 | 2.6 | 30 | 11 | 1 | Yes | Yes | Yes |

Table 3 shows the average proposal rate and RFP award rate for RFPs in each cluster, for the same clusters as in Table 1. Substantial differences in these RFP outcome attributes are seen among clusters. High-attendance corporate events—shown in cluster 3—have a low proposal rate of 32% from hotels and a low award rate of 9% by planners. By contrast, non-corporate events with lower-attendance—shown in cluster 2—have a high proposal rate of 68% as well as a higher award rate.

TABLE 3

Average values of proposal and RFP award rates in each cluster, for the same clusters as shown in Table 2.

| Cluster no. | Avg proposal rate in cluster (%) | Avg RFP award rate in cluster (%) |
|---|---|---|
| 1 | 47 | 20 |
| 2 | 68 | 18 |
| 3 | 32 | 9 |
| 4 | 44 | 16 |
| 5 | 41 | 16 |

Table 4 presents average RFP award rates in these clusters aggregated at the chain scale level, and shows revealing patterns. Non-corporate events (cluster 2) showed substantially higher award rates for Economy through Upscale brands than for Upper Upscale and Luxury brands. Corporate meetings consisting of low attendance and short-duration (cluster 5), have a vanishingly small award rate for Economy brands, but high award rates for Upper Midscale through Luxury brands.

TABLE 4

Average RFP award rates aggregated from hotels in various chain scales, for the same clusters as shown in Table 2. The award rates for Independent hotels are not shown.

| Cluster no. | Economy (%) | Midscale (%) | Upper Midscale (%) | Upscale (%) | Upper Upscale (%) | Luxury (%) |
|---|---|---|---|---|---|---|
| 1 | 5 | 7.2 | 8.7 | 9.6 | 8.7 | 8.6 |
| 2 | 22.2 | 12 | 16.7 | 13.3 | 9 | 7.3 |
| 3 | 2.2 | 7.4 | 10.3 | 9.1 | 5.4 | 5.1 |
| 4 | 7.7 | 10.4 | 12 | 10.1 | 9.9 | 9 |
| 5 | 0 | 6.7 | 9 | 10.8 | 11.7 | 8.1 |

In the next step, the system focuses on RFP award rates to specific hotel chains. Table 5 shows award rates to five randomly selected hotel chains in the same clusters as in the earlier tables. The chain names have been replaced by letter designations A-E. For most chains, large inter-cluster variations are seen in the award rates. For some chains, the difference between the highest and lowest award rates can be as large as a factor of 5. For all chains studied, there are a few clusters in which the RFP award rate is substantially higher than the overall award rate for that chain. The system designates these clusters as High Award Rate (HAR) clusters for that chain.

Use Cases

Having identified the clusters for the data, and compared those clusters to specific hotels or hotel brands, the system can make recognitions of which hotels have a high likelihood of winning a given RFP based on the cluster data, and which hotels do not have a high likelihood of winning that same RFP. These differentiating award rates mean that for a given hotel or brand, they may have a historical reward rate for a given attribute which is higher (or lower) than their peers. Based on this, the system can identify from which RFPs, based on the assigned clusters, a given hotel or brand has the best chance of winning.

This is illustrated in Table 5:

TABLE 5

| Average RFP award rates to five hotel chains in each cluster, for the same clusters as shown in Table 2. | | | | |
|---|---|---|---|---|
| Cluster no. | Chain A (%) | Chain B (%) | Chain C (%) | Chain D (%) | Chain E (%) |
| 1 | 12 | 17.6 | 19 | 8.5 | 19 |
| 2 | 11.5 | 19.3 | 18.7 | 8 | 20 |
| 3 | 8.6 | 14.4 | 16.3 | 7.6 | 20.7 |
| 4 | 17 | 24 | 19.4 | 13.4 | 14.7 |
| 5 | 15.7 | 16.3 | 16.3 | 7.8 | 12.5 | where, for example, chain E has a 20.7% chance of winning RFPs from cluster 3, but only a 12.5% chance of winning an RFP from cluster 5. When allocating resources to try and win RFPs, chain E should focus their efforts with respect to cluster 3 over cluster 5 because of the higher likelihood that they will win the RFP from cluster 3.

Conclusion

Augmented intelligence derived from data science and machine learning is impacting most industry sectors. Data mining and machine learning can enhance decision-making by providing highly actionable insights for any area of business where decision-making is involved and large volumes of data exist. While humans remain the ultimate decision-makers, data can strongly inform the decisions at scale.

Users of the disclosed concepts can have a large volume of data on group business of hotels on both the demand and the supply sides. They can this data to generate insights that will help hotels receive relevant RFPs and optimize their responses. Using machine learning driven clustering of RFPs, the user is able to identify RFPs with desired outcomes, such as hotels having a high probability of being awarded the business. Potential use cases of this information include creating alerts on unresponded RFPs, driving advertisements targeting specific RFPs types, and generating competitor insights for hotel brands and chains.

It is important to note that ML algorithms can take into account changes in data because of long-term or short-term trends in the meetings and events landscape. As an example: in the Covid-19 induced situation, with decreased RFP volumes and fundamental changes in event characteristics, our RFP clusters can be recreated with an appropriate dataset to yield insights that will continue to be relevant.

Training and Implementing a Machine Learning Algorithm

As described above, this clustering finds similar metrics between collected data, provides a way to determine similar attributes of collected data, and/or evaluates classification accuracy. For instance, a measurement method such as S_Dbw, a popular clustering validation metric may be computed. The smaller S_Dbw is, the better clusters are. The processing can evaluate the quality of clusters learned by a method of the present disclosure in one embodiment. S_Dbw is a method to measure the quality of clusters. If the data collected has better embedded data, better clusters would result. A methodology in the present disclosure represents an RFP as different representations, and compares the S_Dbws computed on them.

Based on different document representations (embeddings), an algorithm such as k-means clustering may be used to perform clustering on collected data and use the results to identify different attributes of potential guests or producers of RFPs. The labeled and/or clustered data can be separated into a training set and a test set. For instance, 80% of the labeled data may be used as a training set, while 20% of the labeled data may be used for a test set, in machine learning. A support vector machine (SVM) classifier may be trained on the training set. The trained classifier predicts the category of any test data. The trained classifier may be implemented as a part of a search engine, for example, for finding a specific RFP of a requested category, thereby improving the search engine capability.

A machine learning algorithm can then be trained based on the labeled/clustered RFPs. The training may include separating the labeled/clustered RFPs into a training set and a test set, and generating a machine learning model that predicts a label for a subsequent RFP based on the training set and the test set.

As an example of how to train a neural network which in turn is converted to executable code as a machine learning model, a hotel or other entity can collect known data (corresponding to RFPs, rooms required, if the RFP was satisfied, etc. This collected data can be compared via a sensitivity analysis, resulting in correlations between the known data, using models such as a one-at a time test, a derivative-based local method, regression analysis, variance-based method, screening, scatter plots, etc., thereby determining how a given input/variable affects the likelihood of a specific condition. The correlation outputs of the sensitivity analysis identify the likelihood of a given variable affecting one or more of the other variables within the collected data.

The outputs of the sensitivity analysis, as well the sensitivity analysis training data, can then be used by to construct a neural network. For example, the correlations and test data associated with the sensitivity analysis can be input into Python, MatLab®, or other development software configured to construct neural network based on factor-specific data. Depending on the specific scenario, users can adjust the neural network construction by selecting from optimization methods including (but not limited to) the least-squares method, the Levenberg-Marquardt algorithm, the gradient descent method, or the Gauss-Newton method. The neural network can make predictions regarding one or more of the given input variables by using the other variables corresponding to the same data which were used to train the neural network. The resulting neural network, consisting of nodes connected by the determined correlations, can be converted to code as the machine learning algorithm. As additional RFPs and data points are collected, they can be input into the system, and the correlations between the nodes of the neural network can be modified. In this manner, the machine learning algorithm is modified, or adjusted, over time based on additional information being received.

Figure 10:
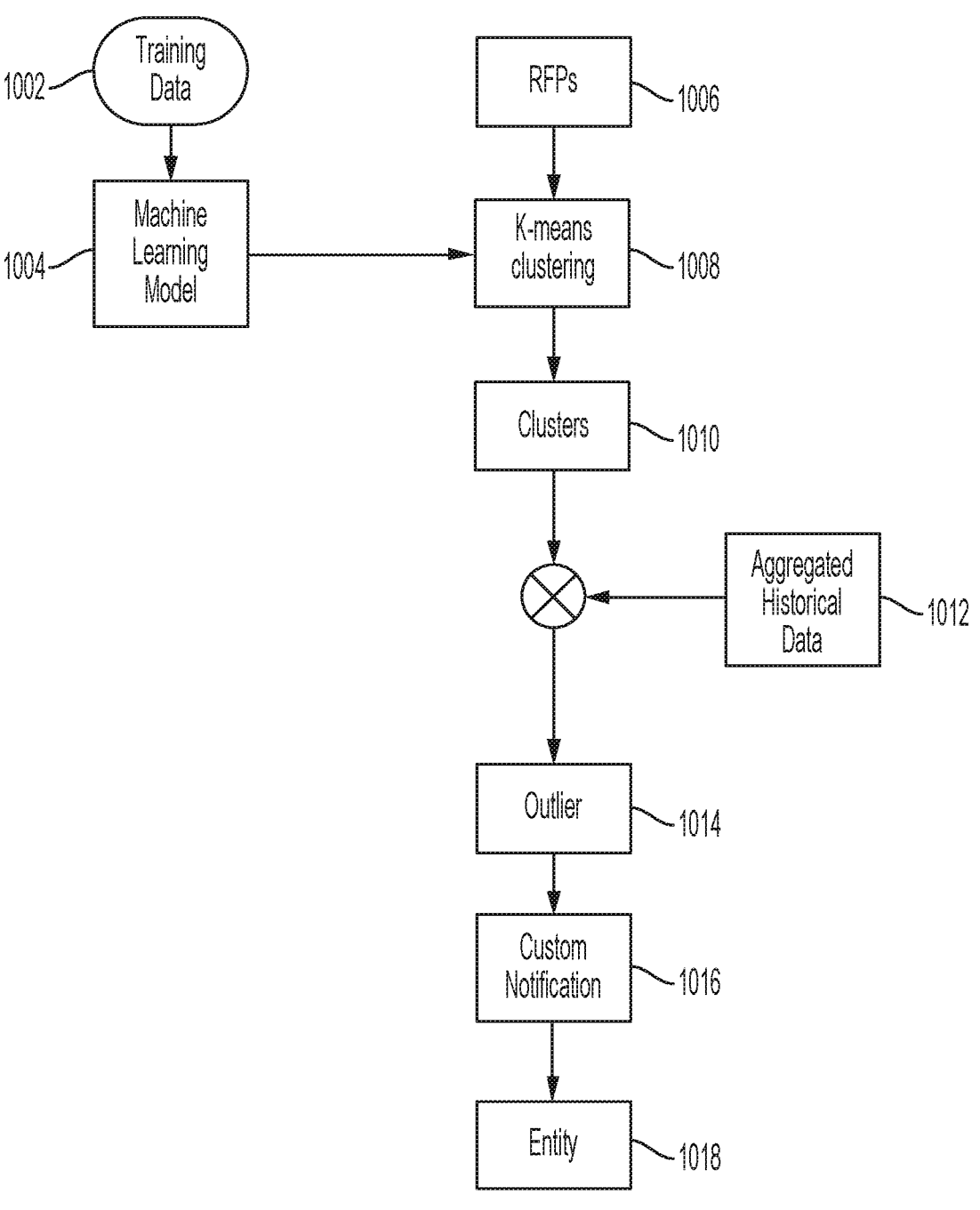
FIG. 10 illustrates an example process flow as described herein.

FIG. 10 illustrates an example process flow as described herein. As illustrated, the system can use training data 1002 to train a machine learning model 1004. The training data 1002 can, for example, be a supply of previously awarded RFPs, having known attributes and previously identified clusters/centroids. The resulting machine learning algorithm 1004 can be an iterative, k-means clustering algorithm which is weighted or modified based on the training data 1002. When new RFPs 1006 are received, the system can use the machine learning model 1004 with the new RFPs 1006 to implement k-means clustering 1008, resulting in clusters 1010. The number of clusters can vary according to configuration, but can, for example, be between ten and twenty five, with the clusters associated with one or more attributes of the RFPs 1006. The system can aggregate historical data 1012, such as data about which previous RFPs had been awarded to which certain entities or brands associated with entities. For example, the aggregated historical data 1012 could identify which hotels had been awarded certain types of RFPs in the past, and what the award rate for that hotel is with respect to specific RFP attributes. The system can then identify, within the aggregated historical data 1012 and the clusters 1010, an outlier 1014, meaning a statistical outlier. Examples of an outlier 1014 can include the entity most likely to win a given RFP for a given attribute, the entity that wins the most RFPs, entities least likely to win an RFP for a given attribute, etc. Once one or more outliers 1014 have been identified, the system can use Natural Language Processing to create a custom notification 1016 for the respective entity 1018 associated with the outlier 1014, and then transmit or otherwise communicate that custom notification 1016 to the entity 1018.

FIG. 11 illustrates an example method as described herein. This method can, for example, be executed by a computer system. As illustrated, the method can include training, via a processor, a machine learning algorithm using a training set of Requests for Proposals (RFPs) (1102). The system executing the method can cluster, via a processor executing the machine learning algorithm, a second set of RFPs according to attributes of the second set of RFPs, resulting in at least two clusters, each cluster corresponding to a respective attribute (1104) and aggregate historical data for a plurality of entities (1106). The system can compare, via the processor, the historical data to the at least two clusters (1108) and identify, via the processor, an outlier within the historical data corresponding to a single attribute of the attributes of the second set of RFPs (1110). The system can then generate, via the processor, an alert based on the outlier (1112) and transmit the alert via a network to an entity within the plurality of entities associated with the outlier (1114).

In some configurations, the machine learning algorithm can execute an iterative k-means clustering algorithm, the iterative k-means clustering algorithm having biases for particular attributes based on the training set of RFPs.

In some configurations, the training of the machine learning algorithm can further include iteratively: generating, via the processor, a silhouette graph of clusters of the training set of RFPs; and calculating, via the processor, a slope for each silhouette in the silhouette graph, resulting in a plurality of slopes, until each slope in the plurality of slopes has is within a threshold slope range.

In some configurations, each entity in the plurality of entities can have a distinct format for their associated RFPs, resulting in a plurality of distinct formats; and the method can further include: receiving, from the plurality of entities, RFPs in the plurality of distinct formats; and normalizing, via the processor, the RFPs in the plurality of distinct formats to a common format, resulting in the second set of RFPs.

In some configurations, each RFP in the second set of RFPs can include: a total number of attendees; a total number of room nights needed; a length of an event; a third party planner flag; a meeting room need; and a corporate flag.

In some configurations, the number of clusters can be between 10 and 25.

In some configurations, the outlier can identify an area where the entity has a higher likelihood of winning an RFP.

Computer System

Figure 12:
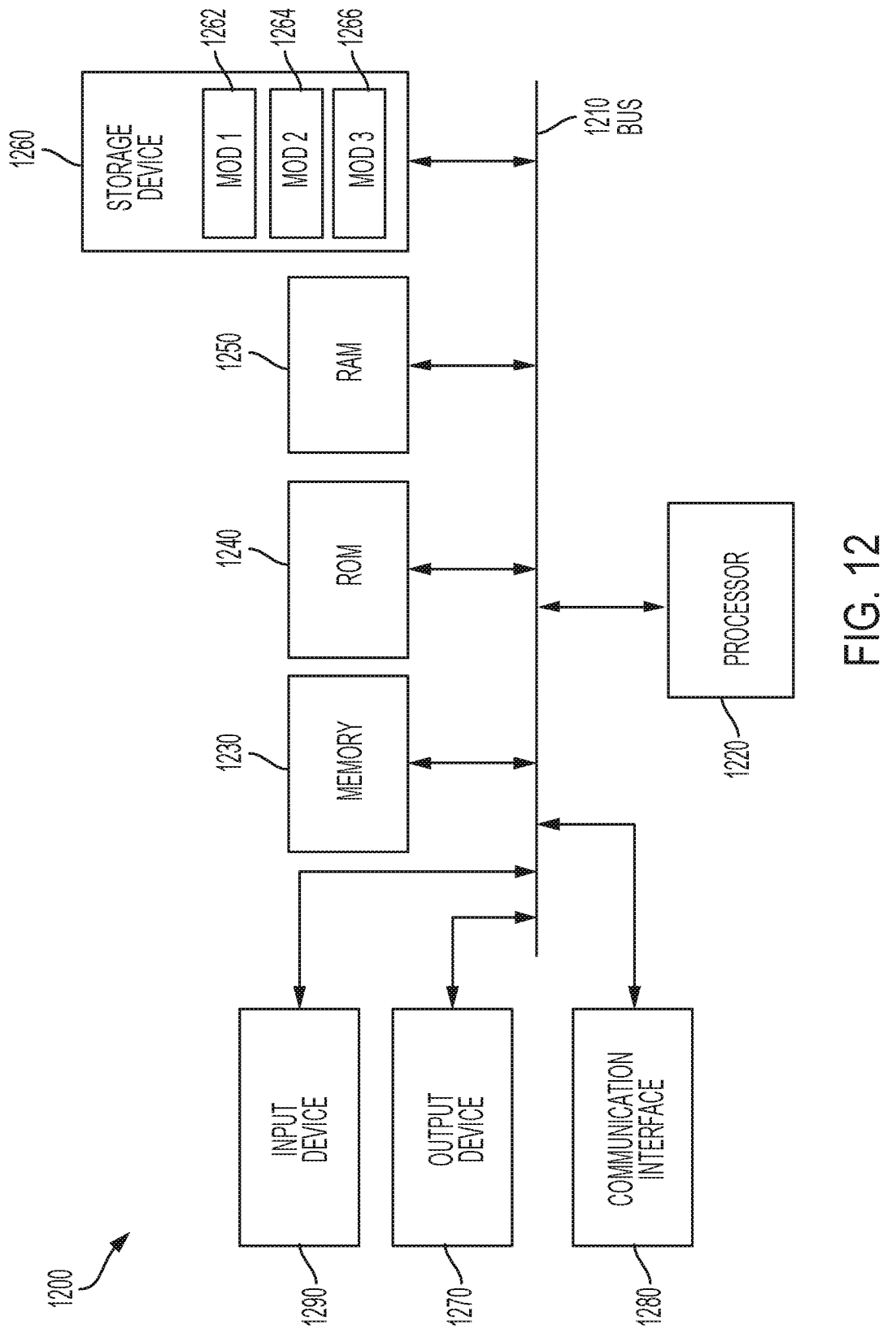
FIG. 12 illustrates an example computer system.

With reference to FIG. 12, an exemplary system includes a general-purpose computing device 1200, including a processing unit (CPU or processor) 1220 and a system bus 1210 that couples various system components including the system memory 1230 such as read-only memory (ROM) 1240 and random access memory (RAM) 1250 to the processor 1220. The system 1200 can include a cache of high-speed memory connected directly with, in close proximity to, or integrated as part of the processor 1220. The system 1200 copies data from the memory 1230 and/or the storage device 1260 to the cache for quick access by the processor 1220. In this way, the cache provides a performance boost that avoids processor 1220 delays while waiting for data. These and other modules can control or be configured to control the processor 1220 to perform various actions. Other system memory 1230 may be available for use as well. The memory 1230 can include multiple different types of memory with different performance characteristics. It can be appreciated that the disclosure may operate on a computing device 1200 with more than one processor 1220 or on a group or cluster of computing devices networked together to provide greater processing capability. The processor 1220 can include any general purpose processor and a hardware module or software module, such as module 1 1262, module 2 1264, and module 3 1266 stored in storage device 1260, configured to control the processor 1220 as well as a special-purpose processor where software instructions are incorporated into the actual processor design. The processor 1220 may essentially be a completely self-contained computing system, containing multiple cores or processors, a bus, memory controller, cache, etc. A multi-core processor may be symmetric or asymmetric.

The system bus 1210 may be any of several types of bus structures including a memory bus or memory controller, a peripheral bus, and a local bus using any of a variety of bus architectures. A basic input/output (BIOS) stored in ROM 1240 or the like, may provide the basic routine that helps to transfer information between elements within the computing device 1200, such as during start-up. The computing device 1200 further includes storage devices 1260 such as a hard disk drive, a magnetic disk drive, an optical disk drive, tape drive or the like. The storage device 1260 can include software modules 1262, 1264, 1266 for controlling the processor 1220. Other hardware or software modules are contemplated. The storage device 1260 is connected to the system bus 1210 by a drive interface. The drives and the associated computer-readable storage media provide non-volatile storage of computer-readable instructions, data structures, program modules and other data for the computing device 1200. In one aspect, a hardware module that performs a particular function includes the software component stored in a tangible computer-readable storage medium in connection with the necessary hardware components, such as the processor 1220, bus 1210, display 1270, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 1200 is a small, handheld computing device, a desktop computer, or a computer server.

Although the exemplary embodiment described herein employs the hard disk 1260, other types of computer-readable media which can store data that are accessible by a computer, such as magnetic cassettes, flash memory cards, digital versatile disks, cartridges, random access memories (RAMs) 1250, and read-only memory (ROM) 1240, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 1200, an input device 1290 represents any number of input mechanisms, such as a microphone for speech, a touch-sensitive screen for gesture or graphical input, keyboard, mouse, motion input, speech and so forth. An output device 1270 can also be one or more of a number of output mechanisms known to those of skill in the art. In some instances, multimodal systems enable a user to provide multiple types of input to communicate with the computing device 1200. The communications interface 1280 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:

training, via a processor, a machine learning algorithm using a first set of Requests for Proposals (RFPs), wherein:

the first set comprises a plurality of variables; and the machine learning algorithm comprises a neural network configured to make predictions based on inputs, the inputs comprising one or more variables from the plurality of variables;

clustering, subsequent to the training using the first set of RFPs, via the processor executing the machine learning algorithm, a second set of RFPs according to attributes of the second set of RFPs, resulting in at least two clusters, each cluster corresponding to a respective attribute;

aggregating historical data for a plurality of entities, wherein the historical data indicates an award rate for each of the plurality of entities with respect to a single attribute of the second set of RFPs, and wherein the award rate is obtained by counting a number of RFPs awarded to each of the plurality of entities versus a number of proposals sent by each of the plurality of entities;

comparing, via the processor, the historical data to the at least two clusters;

identifying, via the processor, an outlier within the historical data, wherein the outlier is associated with an entity within the plurality of entities, and wherein the entity has a higher likelihood of winning an RFP based on the award rate with respect to the single attribute of the second set of RFPs, and wherein the identifying comprises selecting the entity within the plurality of entities as the outlier within the historical data;

generating, via the processor, an alert based on the outlier, wherein the alert is generated using Natural Language Processing; and transmitting the alert via a network to the entity, notifying the entity to submit a proposal for the RFP.

2. The method of claim 1, wherein the machine learning algorithm executes an iterative k-means clustering algorithm, the iterative k-means clustering algorithm having biases for particular attributes based on the first set of RFPs.

3. The method of claim 1, wherein the training of the machine learning algorithm further comprises:

iteratively:

generating, via the processor, a silhouette graph of clusters of the first set of RFPs; and calculating, via the processor, a slope for each silhouette in the silhouette graph, resulting in a plurality of slopes, until each slope in the plurality of slopes is within a threshold slope range.

4. The method of claim 1, wherein each entity in the plurality of entities has a distinct format for their associated RFPs, resulting in a plurality of distinct formats; and the method further comprises:

receiving, from the plurality of entities, RFPs in the plurality of distinct formats; and normalizing, via the processor, the RFPs in the plurality of distinct formats to a common format, resulting in the second set of RFPs.

5. The method of claim 1, wherein the attributes for RFPs in the second set of RFPs comprises:

a total number of attendees;

a total number of room nights needed;

a length of an event;

a third party planner flag identifying if a planner is from an event organization company retained by a hosting company;

a meeting room need; and a corporate flag.

6. The method of claim 1, wherein the number of clusters is between 10 and 25.

7. A system comprising:

a processor; and a non-transitory computer-readable storage medium having instructions stored which, when executed by the processor, cause the processor to perform operations comprising:

training a machine learning algorithm using a first set of Requests for Proposals (RFPs), wherein:

the first set comprises a plurality of variables; and the machine learning algorithm comprises a neural network configured to make predictions based on inputs, the inputs comprising one or more variables from the plurality of variables;

clustering, subsequent to the training using the first set of RFPs, by executing the machine learning algorithm, a second set of RFPs according to attributes of the second set of RFPs, resulting in at least two clusters, each cluster corresponding to a respective attribute;

aggregating historical data for a plurality of entities, wherein the historical data indicates an award rate for each of the plurality of entities with respect to a single attribute of the second set of RFPs, and wherein the award rate is obtained by counting a number of RFPs awarded to each of the plurality of entities versus a number of proposals sent by each of the plurality of entities;

comparing the historical data to the at least two clusters;

identifying an outlier within the historical data, wherein the outlier is associated with an entity within the plurality of entities, and wherein the entity has a higher likelihood of winning an RFP based on the award rate with respect to the single attribute of the second set of RFPs, and wherein the identifying comprises selecting the entity within the plurality of entities as the outlier within the historical data;

generating an alert based on the outlier, wherein the alert is generated using Natural Language Processing; and transmitting the alert via a network to the entity, notifying the entity to submit a proposal for the RFP.

8. The system of claim 7, wherein the machine learning algorithm executes an iterative k-means clustering algorithm, the iterative k-means clustering algorithm having biases for particular attributes based on the first set of RFPs.

9. The system of claim 7, wherein the training of the machine learning algorithm further comprises:

iteratively:

generating a silhouette graph of clusters of the first set of RFPs; and calculating a slope for each silhouette in the silhouette graph, resulting in a plurality of slopes, until each slope in the plurality of slopes is within a threshold slope range.

10. The system of claim 7, wherein each entity in the plurality of entities has a distinct format for their associated RFPs, resulting in a plurality of distinct formats; and the non-transitory computer-readable storage medium has additional instructions stored which, when executed by the processor, cause the processor to perform operations comprising:

receiving, from the plurality of entities, RFPs in the plurality of distinct formats; and normalizing the RFPs in the plurality of distinct formats to a common format, resulting in the second set of RFPs.

11. The system of claim 7, wherein each RFP in the second set of RFPs comprises:

a total number of attendees;

a total number of room nights needed;

a length of an event;

a third party planner flag identifying if a planner is from an event organization company retained by a hosting company;

a meeting room need; and a corporate flag.

12. The system of claim 7, wherein the number of clusters is between 10 and 25.

13. A non-transitory computer-readable storage medium having instructions stored which, when executed by a processor, cause the processor to perform operations comprising:

training a machine learning algorithm using a first set of Requests for Proposals (RFPs), wherein:

the first set comprises a plurality of variables; and the machine learning algorithm comprises a neural network configured to make predictions based on inputs, the inputs comprising one or more variables from the plurality of variables;

clustering, subsequent to the training using the first set of RFPs, by executing the machine learning algorithm, a second set of RFPs according to attributes of the second set of RFPs, resulting in at least two clusters, each cluster corresponding to a respective attribute;

aggregating historical data for a plurality of entities, wherein the historical data indicates an award rate for each of the plurality of entities with respect to a single attribute of the second set of RFPs, and wherein the award rate is obtained by counting a number of RFPs awarded to each of the plurality of entities versus a number of proposals sent by each of the plurality of entities;

comparing the historical data to the at least two clusters;

identifying an outlier within the historical data, wherein the outlier is associated with an entity within the plurality of entities, and wherein the entity has a higher likelihood of winning an RFP based on the award rate with respect to the single attribute of the second set of RFPs, and wherein the identifying comprises selecting the entity within the plurality of entities as the outlier within the historical data;

generating an alert based on the outlier, wherein the alert is generated using Natural Language Processing; and transmitting the alert via a network to the entity, notifying the entity to submit a proposal for the RFP.

14. The non-transitory computer-readable storage medium of claim 13, wherein the machine learning algorithm executes an iterative k-means clustering algorithm, the iterative k-means clustering algorithm having biases for particular attributes based on the first set of RFPs.

15. The non-transitory computer-readable storage medium of claim 13, wherein the training of the machine learning algorithm further comprises:

iteratively:

generating a silhouette graph of clusters of the first set of RFPs; and calculating a slope for each silhouette in the silhouette graph, resulting in a plurality of slopes, until each slope in the plurality of slopes is within a threshold slope range.

16. The non-transitory computer-readable storage medium of claim 13, wherein each entity in the plurality of entities has a distinct format for their associated RFPs, resulting in a plurality of distinct formats; and the non-transitory computer-readable storage medium has additional instructions stored which, when executed by the processor, cause the processor to perform operations comprising:

receiving, from the plurality of entities, RFPs in the plurality of distinct formats; and normalizing the RFPs in the plurality of distinct formats to a common format, resulting in the second set of RFPs.

17. The non-transitory computer-readable storage medium of claim 13, wherein each RFP in the second set of RFPs comprises:

a total number of attendees;

a total number of room nights needed;

a length of an event;

a third party planner flag identifying if a planner is from an event organization company retained by a hosting company;

a meeting room need; and a corporate flag.

18. The non-transitory computer-readable storage medium of claim 13, wherein the number of clusters is between 10 and 25.

* * * * *